United States Patent
Yang et al.

(10) Patent No.: US 11,346,574 B2
(45) Date of Patent: May 31, 2022

(54) AIR SUPPLY DEVICE WITH AN ANNULAR AIR OUTLET AND DESIGN METHOD THEREOF

(71) Applicant: Xi'an University of Architecture and Technology, Xi'an (CN)

(72) Inventors: Bin Yang, Xi'an (CN); Zhe Li, Xi'an (CN); Changqing Yang, Xi'an (CN); Bin Zhou, Xi'an (CN); Wei Su, Xi'an (CN); Shuaixing Xu, Xi'an (CN); Mengchun Wu, Xi'an (CN); Ran Gao, Xi'an (CN); Haiguo Yin, Xi'an (CN); Angui Li, Xi'an (CN)

(73) Assignee: Xi'an University of Architecture and Technology, Xi'an (CN)

(*) Notice: Subject to any disclaimer, the term of this patent is extended or adjusted under 35 U.S.C. 154(b) by 0 days.

(21) Appl. No.: 17/217,969

(22) Filed: Mar. 30, 2021

(65) Prior Publication Data
US 2022/0128261 A1    Apr. 28, 2022

(30) Foreign Application Priority Data
Oct. 27, 2020    (CN) .......................... 202011166152.0

(51) Int. Cl.
| *F24F 13/06* | (2006.01) |
| *G06F 30/17* | (2020.01) |
| *G06F 30/18* | (2020.01) |
| *G06F 111/04* | (2020.01) |
| *G06F 113/14* | (2020.01) |

(52) U.S. Cl.
CPC .............. *F24F 13/06* (2013.01); *G06F 30/17* (2020.01); *G06F 30/18* (2020.01); *G06F 2111/04* (2020.01); *G06F 2113/14* (2020.01)

(58) Field of Classification Search
CPC ...... F24F 13/06; F24F 2013/0616; F24F 7/04; F24F 7/08; F24F 7/10; F24F 2221/14; F24F 2221/38; F24F 2007/002; G06F 30/17; G06F 30/18
USPC ...................... 454/39, 44, 47, 241, 242, 243
See application file for complete search history.

(56) References Cited

U.S. PATENT DOCUMENTS

| 2,210,458 A | * | 8/1940 | Keilholtz | ................ F24F 1/022 |
| | | | | 454/233 |
| 2,848,936 A | * | 8/1958 | Vallero | ................ F24F 13/062 |
| | | | | 454/312 |

(Continued)

*Primary Examiner* — Edelmira Bosques
*Assistant Examiner* — Michael James Giordano
(74) *Attorney, Agent, or Firm* — Ray Quinney & Nebeker P.C.; Paul N. Taylor

(57) ABSTRACT

An air supply device with an annular air outlet and a design method thereof are provided. The device includes an air delivery section arranged in a horizontal plane and communicated with a plurality of air-out sections, wherein an axis of each of the plurality of air-out sections is in a vertical direction; the air delivery section and the plurality of air-out sections are respectively provided with air return ducts communicated with each other, the air return ducts each have a fresh air duct provided therein; an axis of the fresh air duct is parallel to an axis of corresponding air return duct of the air return ducts, and the fresh air duct and the corresponding air return duct are equal in length, the plurality of air-out sections are arranged above office cubicles in a room.

9 Claims, 5 Drawing Sheets

(56) References Cited

U.S. PATENT DOCUMENTS

| | | | | |
|---|---|---|---|---|
| 2011/0039491 A1* | 2/2011 | Khalifa | ................... | F24F 13/04 |
| | | | | 454/305 |
| 2015/0300385 A1* | 10/2015 | Akagi | ..................... | F15D 1/009 |
| | | | | 137/808 |
| 2017/0067659 A1* | 3/2017 | Silver | ....................... | F24F 7/08 |

* cited by examiner

AIR SUPPLY DEVICE WITH AN ANNULAR AIR OUTLET AND DESIGN METHOD THEREOF

CROSS REFERENCE TO RELATED APPLICATION

This application claims the priority and benefit of Chinese Patent Application No. 202011166152.0, entitled "Air Supply Device with an Annular Air Outlet and Design Method thereof" filed with the Chinese Patent Office on Oct. 27, 2020, which is incorporated herein by reference in its entirety.

TECHNICAL FIELD

The application relates to the technical field of ventilation, and in particular to an air supply device with an annular air outlet and a design method thereof.

BACKGROUND ART

Personalized air supply refers to an air supply mode in which an air supply terminal with an adjustment function is installed in a local area near the person, to directly deliver fresh air to a person breathing area, and the person can independently and flexibly control parameters relative to the air supply according to their own needs. In such air supply mode, people can obtain a personalized environment that meets their own needs, and a satisfaction degree of each person with his/her micro-environment can be greatly improved. A personalized air supply terminal device installed in an office cubicle needs to extend an air duct, thereby greatly limiting flexibility of the office cubicle and furniture arrangement in a room; and it is difficult to move and adjust the office cubicle once the personalized air supply terminal device is installed. A personalized top-mounted air supply system solves this problem, it does not occupy an indoor area and is easy to construct. An air outlet of the personalized top-mounted air supply system is located at a top area of a working area, and air is supplied downwards at a relatively high speed, so that an air supply jet reaches a working area of a person.

However, in practical engineering, the use of the personalized top-mounted air supply system avoids a situation in which it is not convenient to arrange an elevated floor due to limited storey height; since a conventional personalized air supply device is generally installed at a position close to a person, an excessively long jet length is not required. Designing the personalized top-mounted air supply system according to a traditional personalized air supply method still faces a number of problems, for example, during an air supply process, fresh air is blended with surrounding air, a core area of fresh air jet cannot reach the person breathing area, and a fresh air flow is reduced, resulting in that air quality in a breathing area of a sitting person and thermal comfort of the sitting person cannot reach an ideal level. On the one hand, considering that a height of a suspended ceiling is 2.7 m, a height of the sitting person breathing area is 1.1 m, and a distance from an air supply outlet of the personalized top-mounted fresh air system to the sitting person breathing area is 1.6 m, which far exceeds a jet length of the core zone of the jet of the conventional personalized air supply system. On the other hand, the personalized top-mounted air supply system compete with a mixed ventilation system for a space of the suspended ceiling, and an unreasonable arrangement will also increase a non-uniformity of air temperature in the room, thereby leading to disturbance of airflow organization in the working area in the room and affecting a comfort feeling of a human body. Meanwhile, existing studies show that a free jet will entrain a large amount of surrounding air during an air supply process, loss of kinetic energy and heat energy are increased, thereby resulting in deterioration of air supply quality.

SUMMARY

An object of some embodiments aims to overcome the disadvantages of the prior art, and to provide an air supply device with an annular air outlet and an air supply method thereof, which are used for solving the technical problem of low air supply quality and poor personal experience in the prior art.

In order to achieve the above-mentioned object, the present disclosure provides the following technical solutions.

An air supply device with an annular air outlet includes an air delivery section arranged in a horizontal plane and communicated with a plurality of air-out sections, and an axis of each of the air-out sections is in a vertical direction.

The air delivery section and the air-out sections are respectively provided with air return ducts communicated with each other, the air return ducts each have a fresh air duct provided therein. An axis of the fresh air duct is parallel to an axis of corresponding one of the air return ducts. The fresh air duct and the corresponding air return duct are equal in length. The air-out sections are provided above office cubicles in a room.

The present disclosure is further improved in that:

In some embodiments, a cross-sectional shape of the air return ducts may be the same as that of the fresh air duct.

In some embodiments, the cross-sectional shape of each of the air return duct and the fresh air duct may be circular or regular polygonal.

In some embodiments, a lower portion of the fresh air duct of the air delivery section may be contacted with a lower portion of the air return duct of the air delivery section.

In some embodiments, the fresh air duct and the corresponding air return duct in the air-out section may be coaxial.

In some embodiments, initial temperatures of fresh air and air return at an inlet of the air delivery section may be the same, and velocities of the fresh air and the air return at the inlet of the air delivery section may be the same.

In some embodiments, the air return duct in the air delivery section may be connected with a background air section.

In some embodiments, an outlet of the background air section may be provided with a flow diffuser.

A design method of an air supply device with an annular air outlet, includes the following steps of: determining a diameter of the air return ducts and a distance $x_1$ from the air outlet to a most distal end of a core zone of the jet based on a diameter of the fresh air duct, a fresh air flow and a fresh air ratio, and setting $x_2$ as a distance from the air outlet to the most distal end of the core zone of the jet when an air-out duct has only the fresh air duct; determining that the diameter of the air return ducts meets a requirement when $x_2$ is less than $x_1$ and a difference value between a distance from the air outlet to the floor and $x_1$ is within a range of 1.1-1.3 m; and if the diameter of the air return ducts does not meet the requirement, adjusting the diameter of the fresh air duct in each of the air return duct until the diameter of the air return ducts meets the requirement; and arranging air return ducts each with the fresh air duct provided therein, above office cubicles in a manner of one office cubicle corresponding to one air return duct, according to a number of office cubicles in a room.

In some embodiments, the diameter of the fresh air duct may be within a range of 0.01 m-0.2 m.

Compared with the prior art, the embodiments have the following technical effects:

The present disclosure discloses an air supply device with an annular air outlet. The device can integrate a mixed ventilation air supply outlet with a fresh air supply outlet of a personalized top-mounted air supply device. By disposing the fresh air duct in the air return duct and disposing the fresh air duct above office cubicles in a room, a core area of the fresh air jet is extended to a head of a person, so as to realize mixed ventilation and personalized air supply, save energy consumption and improve an air quality and perceptible heat comfort in a breathing area. The following technical problems are solved: the core zone of the jet in a current personalized top-mounted air supply system is short, fresh air cannot reach a breathing area effectively, and a jet length of fresh air is extended by increasing an air speed, which causes the so that a person to have a "blowing feeling".

Further, the cross-sectional shape of the air return duct is the same as that of the fresh air duct, so as to ensure a mixing effect of two types of air.

Further, the lower portion of the fresh air duct in the air delivery section is contacted with the lower portion of the air return duct of the air delivery section, so that the fresh air duct in a horizontal section is directly arranged inside the air return duct, thereby reducing construction cost.

Further, the fresh air duct and the air return duct in the air-out section are coaxial, so as to ensure a mixing effect of two types of air.

Further, an air supply form with the fresh air being wrapped with the return air which has a temperature and velocity equal to that of the fresh air, is adopted, so as to enhance a heat insulation effect of the fresh air duct in the air supply device.

Further, the air delivery section is communicated with a background air section which is further communicated with the air return duct, so as to eliminate heat load in the room.

Further, the background air section is provided with a flow diffuser, so that the return air flowing out from one background air section can be mixed with the air supplied from the outlets of multiple vertical sections simultaneously.

The present disclosure further discloses a design method of the air supply device with the annular air outlet. The design method designs the fresh air duct and the air return duct meeting requirements based on the air supply device with an annular air outlet, according to a structure of the device and a building height in a specific room. In the method, the fresh air duct is arranged above an office cubicle in a room so that the core area of the fresh air jet is extended to a head of a person, thus mixed ventilation and personalized air supply is achieved, thereby saving energy consumption and improving air quality and perceivable heat comfort in a breathing area. The following technical problems are solved: the core zone of the jet in a current personalized top-mounted air supply system is short, the fresh air cannot reach the breathing area effectively, and the jet length of the fresh air is extended by increasing an air velocity, which causes the person to have a "blowing feeling".

Figure 1:
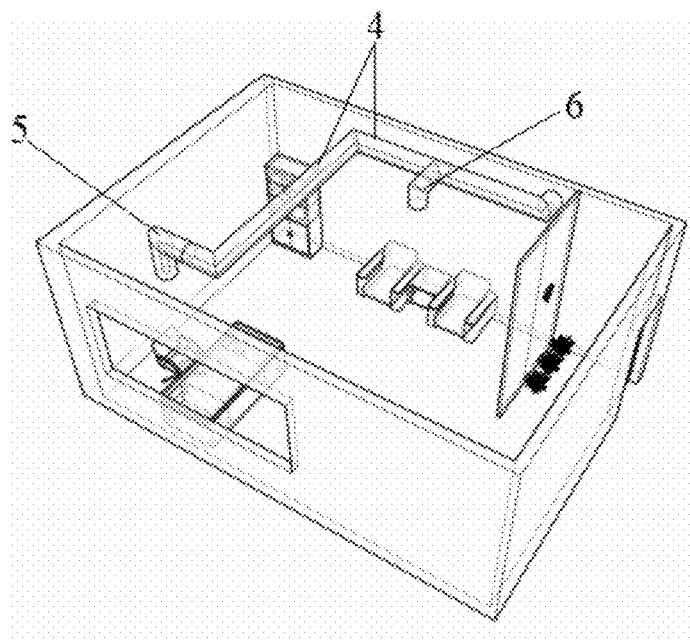
FIG. 1 is a system layout view of the present disclosure.
Figure 2:
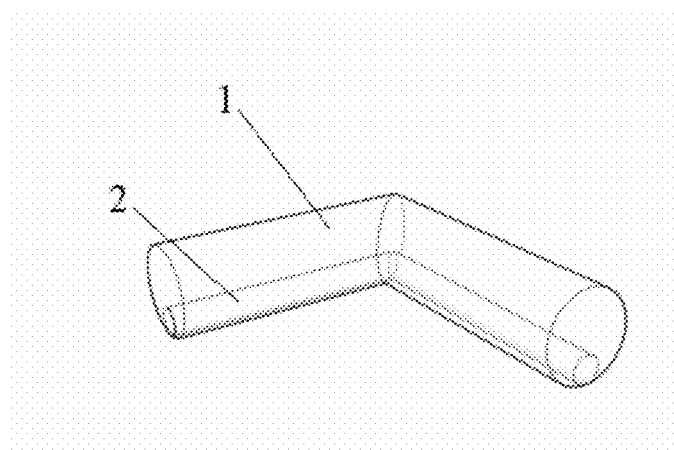
FIG. 2 is a schematic diagram of an air delivery section according to the present disclosure.
Figure 3:
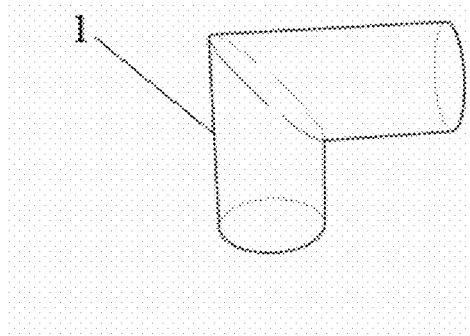
FIG. 3 is a schematic diagram of a background air section according to the present disclosure.
Figure 4:
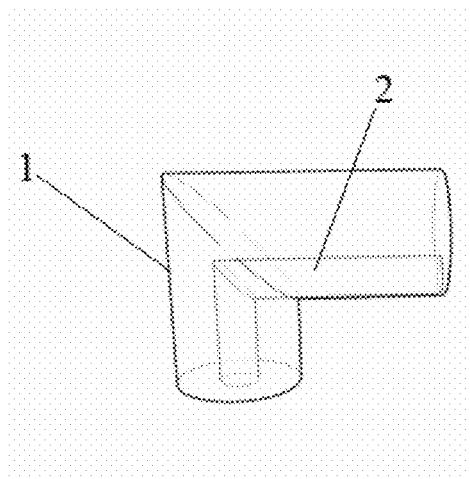
FIG. 4 is a schematic diagram of an air-out section according to the present disclosure.

List of the reference characters: 1 air return duct; 2 fresh air duct; 3 air outlet; 4 air delivery section; 5 air-out section; 6 background air section; 7 air return portion; 8 fresh air portion; 9 diffusion angle.

DETAILED DESCRIPTION OF THE EMBODIMENTS

The present disclosure is further described in detail below with reference to the drawings.

In the description of the present disclosure, it should be noted that directional or positional relationships indicated by the terms such as "center", "upper", "lower", "left", "right", "vertical", "horizontal", "inner", and "outer" is based on directional or positional relationships shown in the drawings, which are illustrated only for convenience in describing the present disclosure and simplifying the description, but not for indicating or implying that the referred device or element must have a specific orientation, or be constructed and operated in a specific orientation, and thus should not be construed as limiting the present disclosure. The terms "first", "second" and "third" are used for descriptive purposes only and are not to be construed as indicating or implying relative importance. In addition, unless expressly specified and defined otherwise, the terms "mounted", "coupled" and "connected" should be understood broadly, for example, it can be interpreted as connected fixedly or detachably, or connected directly or indirectly via an intermediate medium, or it can be interpreted as two elements being internally communicated with each other. For a person of ordinary skill in the art, the specific meanings of the above terms in the present disclosure can be understood according to specific context.

In order to achieve the above-mentioned objects, the present disclosure adopts the following technical solutions:

An air supply device with an annular air outlet and a design method thereof are provided. Referring to FIGS. 1-4, the device is arranged at a top of a room. The device includes two parts: an air return duct 1 and a fresh air duct 2. A duct diameter of the air return duct 1 is larger than a duct diameter of the fresh air duct 2. The air return duct 1 is configured to be sleeved over the fresh air duct 2, and the air return duct 1 and the fresh air duct 2 respectively have cross-sections with the same shape, which in some embodiments, is circular or regular polygonal. With such structure, the whole air outlet 3 is divided into two areas, which are a return air supply area and a fresh air supply area respectively.

The device is divided into an air delivery section 4 arranged in a horizontal plane and an air-out section 5 arranged in a vertical direction. An inlet of the air delivery section 4 is an air inlet port for fresh air and return air. An outlet of the air delivery section 4 is connected to an air inlet port of the air-out section 5, an air-out port of the air-out section 5 is the air outlet 3 of the whole device, and the air outlet 3 is arranged above a person in a room.

In some embodiments, in one room, the air-out section 5 is arranged above a person, and when there are a plurality of persons in the room, the air-out section 5 can be arranged above each person, and the air delivery section 4 is arranged in a horizontal plane at the top of the room according to requirements for arranging the air-out section 5, so as to ensure that air is flowed out of each air-out section 5.

In some embodiments, the fresh air duct 2 in the air delivery section 4 is directly placed inside the air return duct 1, without being mounted via a frame, for saving costs. Initial temperatures and velocities of the return air and the fresh air in the air delivery section 4 are the same at the time of just flowing through the air outlet 3 of the air-out section 5.

In some embodiments, the fresh air duct 2 and the air return duct 1 in the air-out section 5 are arranged coaxially to form a lower jet structure. An upper portion of an air supply terminal device in the air-out section 5 is connected to air supply branch ducts configured to supply the return air and the fresh air, and a cross-sectional shape of a jet opening used in a lower portion of the air supply terminal device is not particularly required, and a preferred cross-sectional shape is circular, but is not limited thereto.

In some embodiments, the cross-sectional areas of the air return duct 1 and the fresh air duct 2 are the same. In some embodiments, the cross-sectional shape is circular or regular polygonal. It is more preferable that the cross-sectional shape is a circular shape, so that an air flow flows out in a circular shape. A flow rate at a circular air outlet of the fresh air duct is 10 L/s, and a diameter of the outlet can be within a range of 0.01 m-2 m, preferably 0.1 m. The diameter of the outlet of the fresh air duct is not too large. A flow of the return air supplied through the air return duct 1 with the fresh air duct 2 provided therein is not more than 90 L/s.

In some embodiments, elbows located at positions where the ends of the air-out section and the background air section are connected with the air supply branch ducts, adopt right-angle elbows or arc-shaped.

In some embodiments, the air delivery section 4 is communicated with the background air section 6. The background air section 6 is in a bending shape and includes a horizontal section and a vertical section communicated with each other, in which one end of the horizontal section is connected with the air delivery section 4, and a distal end of the vertical section faces toward the inside of the room. The background air section 6 is only supplied with the return air to eliminate heat load in the room. And more preferably, the distal end of the vertical section of the background air section 6 is provided with a flow diffuser, which is selected based on related specifications of Heating, Ventilating and Air Conditioning design.

Specifically, after being processed by an air handling unit, the fresh air and the return air are separately delivered via the fresh air duct 2 and the air return duct 1 of the air delivery section 4. The return air out of the air-out section 5 wraps the fresh air to provide personalized air supply support for a person in an office cubicle below the air-out duct. The background air section 6 only supplies the return air to eliminate the thermal load in the room.

The main idea of the present disclosure is: when a fresh air volume and a duct diameter of an air supply outlet of an existing personalized top-mounted air supply system remain unchanged, an air jet supplied by the existing air supply device is not enough due to entrainment of the fresh air jet by surrounding air, resulting in a low fresh air content in a breathing area of the person, a flow problem of the fresh air wrapped by the return air with a temperature and a velocity equal to that of the fresh air is studied, so as to enable a head of a person to be located in a core area of the fresh air jet and improve the quality of the fresh air.

The design principle of the present disclosure is as follows.

After airflows flow out of the air return duct 1 and the fresh air duct 2, since the two airflows are at the same temperature and velocity, a mass transmission effect may be ignored, and the two airflows may be regarded as one airflow. In addition, the return air is delivered into the room by a separate air supply outlet via the background air section 6 to form background air. The return air is blended with the background air. Because the fresh air in the core area of the jet is protected by the return air against the surrounding background air, the entrainment effect of the fresh air by the surrounding background air is greatly reduced, thereby greatly increasing a length of the core area of the jet.

Figure 5:
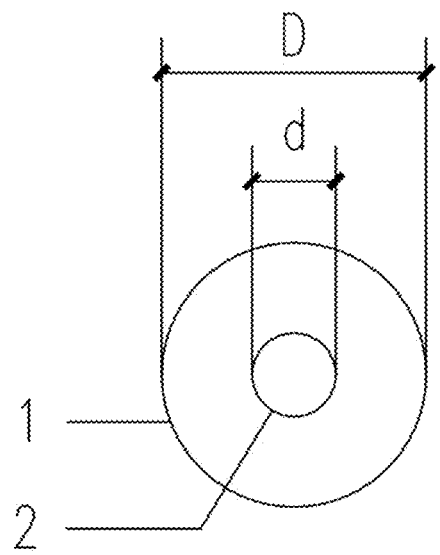
FIG. 5 is a structure schematic diagram the air-out section according to the present disclosure as seen in a bottom view.
Figure 6:
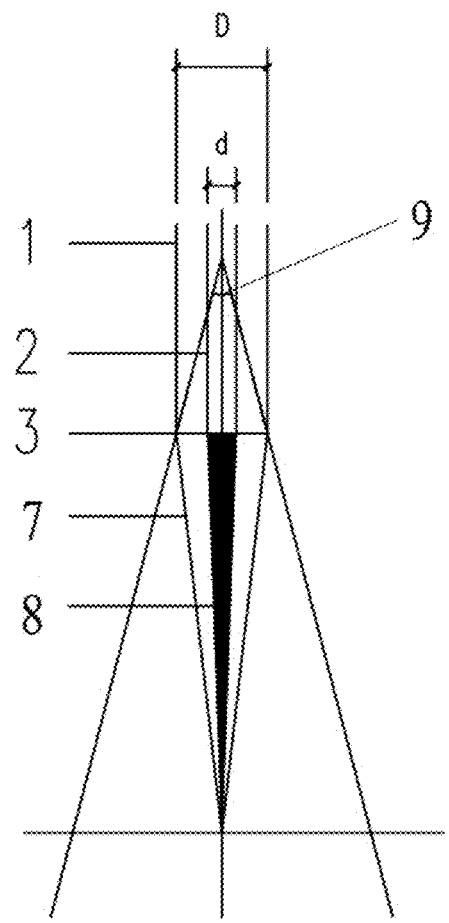
FIG. 6 is a schematic diagram of a jet from the air-out section according to the present disclosure.
Figure 7:
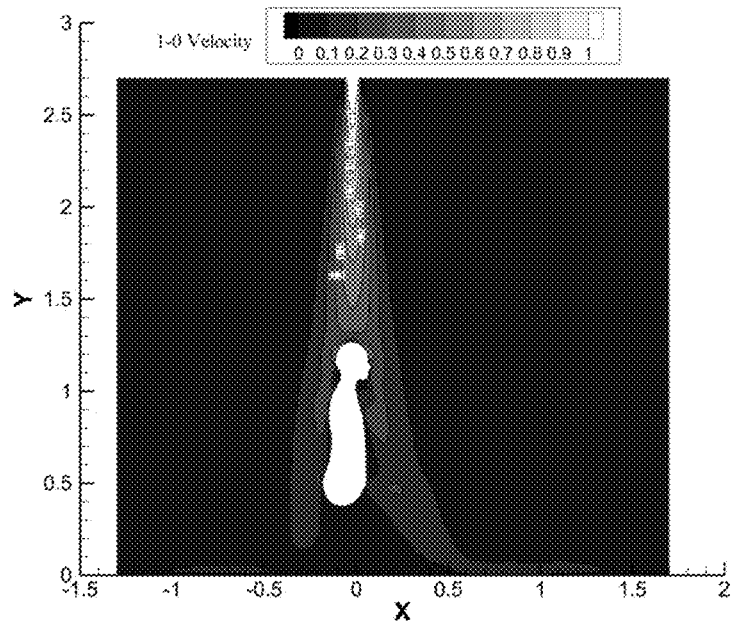
FIG. 7 is a velocity diagram of the jet when a fresh air duct is not protected by return air, according to the present disclosure.
Figure 8:
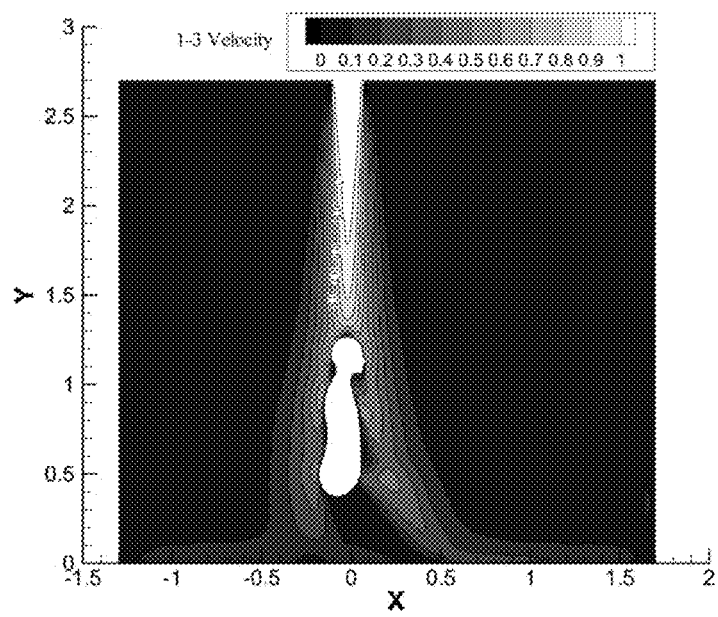
FIG. 8 is a velocity diagram of the jet when a duct diameter ratio of the fresh air duct to the air return duct is 1:3, according to the present disclosure.
Figure 9:
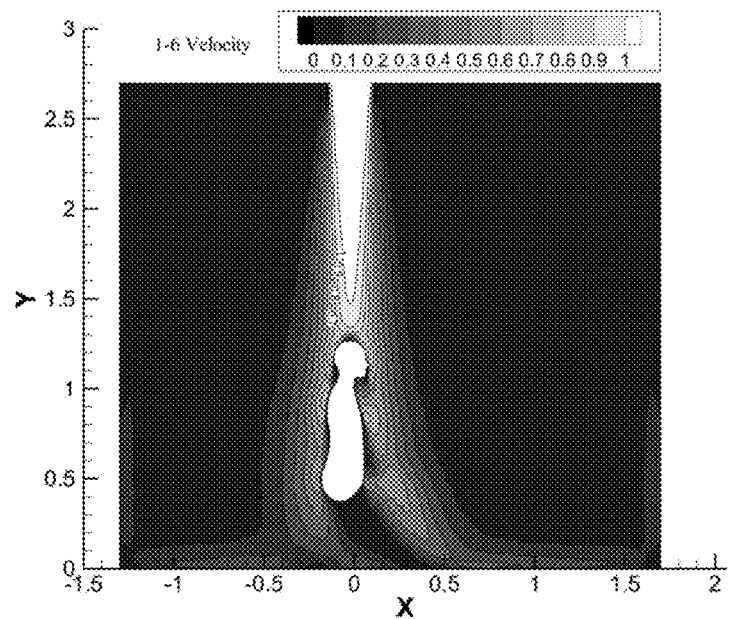
FIG. 9 is a velocity diagram of the jet when a duct diameter ratio of the fresh air duct to the air return duct is 1:6, according to the present disclosure.
Figure 10:
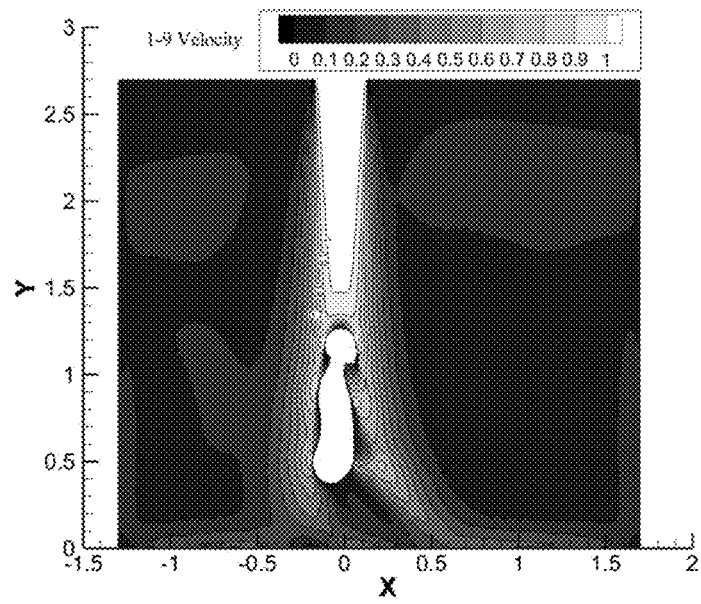
FIG. 10 is a velocity diagram of the jet when a duct diameter ratio of the fresh air duct to the air return duct is 1:9, according to the present disclosure.

Referring to FIGS. 5 and 6, an air supply principle of the personalized personalized top-mounted air outlet with the annular air outlet of the present disclosure is as follows.

Fresh air is jetted into space mediums of the same temperature at an outflow rate $u_0$ through a jet opening with a diameter $d_0$, to diffuse, without limited by a perimeter surface, to form an isothermal free jet. Due to a turbulent momentum exchange between a jet boundary and a surrounding medium, the surrounding air is continuously entrained, and the jet expands continuously, so that a velocity field of the jet cross-section gradually attenuates toward the boundary from a jet center and continuously changes along a jet length. As a result, the flow increases along the jet length and the diameter of the jet increases, but a total momentum on each cross-section remains unchanged. In a jet theory, a segment (core zone of the jet) of the jet which has a constant jet axial velocity is referred to as a starting segment. A flow at the air outlet may be expressed as:

$$G = v \Box A \tag{1}$$

In the expression, G is a flow through air duct, with an unit of m³/s; v is an air velocity through an air flow cross-section in the duct, with an unit m/s; and A is a cross-sectional area of the air flow cross-section in the duct, which is expressed as $$\frac{1}{4}\pi d^2,$$

and has an unit of m².

Studies on regularity of the free jet show that change of parameters of a starting segment of the jet is related to $$\frac{ax}{d_0};$$

where x is a distance from a pole of the jet to a given cross-section, a is a dimensionless turbulence coefficient, its value depends on a form of the air outlet and is related to a diffusion angle of the jet, namely:

$$tg\theta = 3.4a \quad (2)$$

Therefore, there are different values of a for different forms of the air outlet. The value of a is related to a structure of the air outlet. The structure is more advantageous for outflow turbulence and jet diffusion, the value of a is more large, the turbulence coefficient of the jet through a circular duct generally takes 0.076.

Taking the air outlet as a starting point, an attenuation rule of the axial velocity can be expressed as:

$$\frac{u_x}{u_0} = \frac{0.48}{\frac{ax}{d} + 0.145} \quad (3)$$

In the expression, $u_x$ is axial velocity at a jet cross-section to be calculated and having a distance x away from the air outlet as the starting point, with an unit of m/s; $u_0$ is an average velocity of outflow from the air outlet, with an unit of m/s.

Taking the air outlet as the starting point, the attenuation rule of an axial temperature can be expressed as:

$$\frac{\Delta T_x}{\Delta T_0} = 0.73 \frac{u_x}{u_0} \quad (4)$$

In the expression, $\Delta T_x = T_x - T_n$, $\Delta T_0 = T_0 - T_n$; $T_0$ is a jet temperature at the air outlet, with an unit of K; $T_x$ is a jet axial temperature at a distance X from the air outlet, with an unit of K; $T_n$ is a temperature of surrounding air, with an unit of K.

In the air-out section, the cross-sections of the fresh air duct and the air return duct is circular or regular polygonal.

The specific design process is as follows.

In step 1, fresh air flow $G_0$ and fresh air ratio K of the air supplied are determined according to experience and actual conditions, a diameter d of the fresh air pipe is set to be 0.01-0.2 m, the ratio K of the fresh air and the return air is set, and the velocities and temperatures of the fresh air and the return air at the air outlet are the same. Through the above parameters, combined with the formula (1), an expression for calculating the velocity $u_0$ of the fresh air at the air outlet is:

$$u_0 = \frac{G_0}{d} \quad (5)$$

The return air flow is calculated by the fresh air flow $G_0$ and the ratio K of the fresh air to the return air:

$$G_1 = K \cdot G_0 \quad (6)$$

In step 2, the diameter of the air return duct is calculated.

The cross-sectional area A of the air return duct is calculated by the formula (1), and the diameter D of the air return duct is further calculated.

In step 3, it is verified whether the diameter of the air return duct meets the requirement.

In the expression (3), assuming that $u_x = u_0$, the expression (3) is equal to 1. In combination with the diameter of the fresh air duct, a distance x from the air outlet to a most distal end of the core zone of the jet is calculated by the expression (3). For the distance from the air outlet of the annular air outlet to the most distal end of the core zone of the jet in the present disclosure, the calculation expression is:

$$x_1 = 0.335 D/a \quad (7)$$

If there is only the fresh air duct, the calculation expression is:

$$x_2 = 0.335 d/a \quad (8)$$

When $x_1$ is greater than $x_2$, the distance $x_1$ from the air outlet of the annular air outlet to the most distal end of the core zone of the jet is greater than the distance $x_2$ from the air outlet of the common fresh air duct to the most distal end of the core zone of the jet, and it is determined that the value of $x_1$ can meet the requirement. If $x_2 \leq x_1$, it is indicated that the influence of the return air in the annular air duct on the fresh air does not reach the purpose of extending the core zone of the jet. Adjustment is performed by changing d, and at the same time, the diameter D of the air return duct is adjusted correspondingly. Furthermore, if a difference value between a distance from the air outlet to the floor and $x_1$ is within a range of 1.1 m-1.3 m, and it is determined that the value of $x_1$ meets the requirement. If the difference value is not within the range of 1.1 m-1.3 m, it is indicated that the return air in the annular duct of the present disclosure is insufficient to protect the fresh air. Adjustment is performed by changing d, and at the same time, the diameter D of the air return duct is adjusted correspondingly, so that the difference value between the distance from the air outlet to the floor and $x_1$ is within the range of 1.1 m-1.3 m. Under special conditions, if the difference value is not within the range of 1.1 m-1.3 m, d and D should be adjusted so that the difference value is as close to the range of 1.1 m-1.3 m as possible. The common fresh air duct mentioned in the present disclosure is only a circular duct rather than a sleeved structure in the present disclosure.

Embodiment 1

Hereinafter, the embodiments given by the inventors are described, and the present disclosure is not limited to the following specific embodiments, and equivalent changes made on the basis of the technical solutions of the present disclosure all belong to the scope of protection of the present disclosure.

The fresh air flow G supplied in personalized manner is 10 L/s, the fresh air ratio is 10%, the diameter d of the fresh air duct is 0.1 m, and the indoor temperature $T_x = 26°$ C. The air supply temperature difference is 4° C., that is, the air supply temperature $T_0 = 22°$ C. The ratio of the fresh air to the return air is 1:9. The velocity and temperature of the fresh air and the return air at the air outlet are the same.

According to the expression (1), the air velocity $u_0$ of the fresh air duct at the air outlet is 1.27 m/s, and the diameter D of the air return duct is 0.316 m. According to the expression (2), the diffusion angle $tg\theta$ is 0.2584, and the distance $x_0$ from the pole to the air outlet is 0.61 m. Since the velocity of the core zone of the jet is consistent with that of the jet at the air outlet 3, according to the expression (3), the distance $x_1$ from the air outlet to the most distal end of the core zone of the jet is 1.39 m, and if there is no protective airflow, the distance $x_2$ from the fresh air outlet to the most distal end of the core zone of the jet is 0.44 m, the distance X from the pole of protective air including return air and fresh air to the distal end of the core zone of the jet is 2 m, and the diffusion radius R of the most distal end of the core zone of the jet is 0.52 m. According to the expression (4), the jet axial temperature at the distance $x_1$ of 1.39 m from the air supply outlet is $T_x=23°$ C.

If a distance from the suspended ceiling to the floor is 2.7 m, a height of the breathing area in the sitting workplace corresponding to the air supply outlet, is 1.1 m, a height of a head is 1.3 m, a height of the most distal end of the core zone of the jet is 1.31 m, which is near to the head height. Most of the jet core falls into the breathing area after the velocity of the jet core is reduced and the core zone of the jet is extended by 3.16 times, thereby greatly improving a fresh air supply distance and air supply quality. For the fresh air just beyond the most distal end of the core zone of the jet, it is blended with the surrounding air, and can still have high freshness.

Embodiment 2 (Simulation)

In order to verify the air supply effect of the embodiment, the inventors have performed numerical simulation on the air supply outlet, in which the diameter d of the fresh air duct for personalized air supply is 0.1 m, the velocity at the air outlet is 1 m/s, and the distance from the air outlet to the floor is 2.7 m. The simulation result is shown in FIGS. 7-10. The length of the core zone of the jet without return air protection is 0.3 m. The length of the core zone of the jet is 0.9 mm when the duct diameter ratio of the fresh air duct to the air return duct is 1:3. The length of the core zone of the jet is 1.25 m when the duct diameter ratio of the fresh air duct to the air return duct is 1:6. The length of the core zone of the jet is 1.25 m when the duct diameter ratio of the fresh air duct to the air return duct is 1:9. As the return air protection is added, the core zone of the jet is greatly extended. It is worth noting that according to FIGS. 9 and 10, due to the obstruction of the person below the air outlet, the length of the core zone of the jet between the two core zone of the jet is not much different. Therefore, it is more suitable that a duct diameter ratio of the fresh air duct to the air return duct is 1:6.

In summary, after adopting this design, compared with the fresh air jet without return air protection, for the fresh air duct and the air return duct with the duct diameter ratio of 1:3, 1:6, 1:9, the core zone of the jet is greatly extended, so that the air quality of the air supplied surrounding the head of the sitting person is greatly improved. For the specific implementation, the form and size of the end opening of the air-out section may be determined according to the method of Embodiment 1 and Embodiment 2, according to the work field requirements. Therefore, the design method for the personalized personalized top-mounted air supply device with an annular air outlet according to the present disclosure can effectively improve the air supply distance, and effectively improve the fresh air quality of the breathing area of the sitting person.

The above-mentioned description is merely exemplary embodiments of the present disclosure, and is not intended to limit the present disclosure. Any modifications, equivalent replacements, improvements, etc. made within the spirit and principle of the present disclosure should be included within the scope of protection of the present disclosure.

What is claimed is:

1. An air supply device with an annular air outlet, comprising an air delivery section arranged in a horizontal plane and communicated with a plurality of air-out sections, wherein an axis of each of the plurality of air-out sections is in a vertical direction;

the air delivery section and the plurality of air-out sections are respectively provided with air return ducts communicated with each other, the air return ducts each have a fresh air duct provided therein; an axis of the fresh air duct is parallel to an axis of corresponding air return duct of the air return ducts, and the fresh air duct and the corresponding air return duct are equal in length, the plurality of air-out sections are arranged above office cubicles in a room; wherein temperatures of fresh air and return air at an inlet of the air delivery section are the same, and wherein the fresh air is protected by the return air against entrainment with background room air.

2. The air supply device according to claim 1, wherein a cross-sectional shape of the air return ducts is the same as that of the fresh air duct.

3. The air supply device according to claim 1, wherein the cross-sectional shape of each of the air return ducts and the cross-sectional shape of the fresh air duct are circular or regular polygonal.

4. The air supply device according to claim 1, wherein a lower portion of the fresh air duct in the air delivery section is contacted with a lower portion of an air return duct in the air delivery section.

5. The air supply device according to claim 1, wherein the fresh air duct and the corresponding air return duct in each of the plurality of air-out sections are coaxial.

6. The air supply device according to claim 1, wherein an air return duct in the air delivery section is connected with a background air section.

7. The air supply device according to claim 6, wherein an outlet of the background air section is provided with a flow diffuser.

8. A design method of the air supply device with the annular air outlet according to claim 1, comprising the following steps of:

determining a diameter of the air return ducts and a distance $x_1$ from an air outlet to a most distal end of a core zone of the jet based on a diameter of the fresh air duct, a fresh air flow and a fresh air ratio; and setting $x_2$ as a distance from the air outlet to the most distal end of the core zone of the jet when an air outlet section has only the fresh air duct; determining that the diameter of the air return ducts meets a requirement when $x_2$ is less than $x_1$ and a difference value between a distance from the air outlet to a floor and $x_1$ is within a range of 1.1 m-1.3 m; and adjusting the diameter of the fresh air duct in each of the air return ducts until the diameter of the air return ducts meets the requirement, if the diameter of the air return ducts does not meet the requirement; and arranging the air return ducts each with the fresh air duct provided therein above the office cubicles in a manner of one office cubicle corresponding to one air return duct, according to a number of office cubicles in a room.

9. The design method according to claim 8, wherein the diameter of the fresh air duct is within a range of 0.01 m-0.2 m.

* * * * *